(12) United States Patent
Kimball

(10) Patent No.: US 10,285,330 B1
(45) Date of Patent: May 14, 2019

(54) AGRICULTURAL IMPLEMENT FOR RECOVERY OF PLASTIC MULCH AND PROCESSING OF THE SAME

(71) Applicant: Joshua Kimball, Bakersfield, CA (US)

(72) Inventor: Joshua Kimball, Bakersfield, CA (US)

( * ) Notice: Subject to any disclaimer, the term of this patent is extended or adjusted under 35 U.S.C. 154(b) by 94 days.

(21) Appl. No.: 15/466,104

(22) Filed: Mar. 22, 2017

(51) Int. Cl.
| | | |
|---|---|---|
| *A01G 13/02* | (2006.01) |
| *A01D 43/063* | (2006.01) |
| *A01D 34/43* | (2006.01) |
| *A01D 34/53* | (2006.01) |
| *A01D 89/00* | (2006.01) |
| *B02C 18/14* | (2006.01) |
| *B08B 5/02* | (2006.01) |
| *B08B 1/00* | (2006.01) |
| *B08B 1/04* | (2006.01) |
| *A01D 101/00* | (2006.01) |

(52) U.S. Cl.
CPC ......... *A01D 43/0636* (2013.01); *A01D 34/43* (2013.01); *A01D 34/53* (2013.01); *A01D 89/003* (2013.01); *A01G 13/0287* (2013.01); *B02C 18/146* (2013.01); *B02C 18/148* (2013.01); *B08B 1/002* (2013.01); *B08B 1/04* (2013.01); *B08B 5/02* (2013.01); *A01D 2101/00* (2013.01); *A01G 2013/0218* (2013.01)

(58) Field of Classification Search
CPC .... A01D 43/0636; A01D 34/43; A01D 34/53; A01D 89/003; A01D 2101/00; B02C 18/148; B02C 18/146; B08B 1/002; B08B 1/04; B08B 5/02; A01G 13/0287; A01G 2013/0218
See application file for complete search history.

(56) References Cited

U.S. PATENT DOCUMENTS

| | | | | |
|---|---|---|---|---|
| 3,175,621 A | * | 3/1965 | Kappelmann | ...... A01G 13/0287 171/53 |
| 3,181,455 A | * | 5/1965 | Gouker | ............. A01G 13/0287 100/100 |
| 3,403,870 A | | 10/1968 | Garaboux | |
| 4,719,742 A | * | 1/1988 | Ermacora | ............. A01D 67/00 56/13.6 |
| 4,771,570 A | | 9/1988 | Nyboer | |
| 4,796,711 A | * | 1/1989 | Chrysler | ............ A01G 13/0287 171/1 |

(Continued)

FOREIGN PATENT DOCUMENTS

| | | | | |
|---|---|---|---|---|
| DE | | 1499046 A1 | * 10/1969 | ........... A01G 13/025 |
| FR | | 2399796 A1 | * 3/1979 | ......... A01G 13/0287 |

(Continued)

*Primary Examiner* — Robert E Pezzuto
*Assistant Examiner* — Adam J Behrens
(74) *Attorney, Agent, or Firm* — James M. Duncan, Esq.; Klein DeNatale Goldner

(57) ABSTRACT

A mobile plastic mulch processing apparatus recovers plastic mulch by first cutting away any vegetation growing above the plastic mulch with a mower head which depends from the frame of the apparatus. The plastic mulch is caught up by a plastic mulch lifting apparatus which pulls the plastic mulch upward from the field and disposes the plastic mulch with a plastic mulch receiving bin. The apparatus may have additional systems which clean the top surface of the plastic mulch before lifting and for shredding the plastic mulch for disposal.

14 Claims, 17 Drawing Sheets

(56) References Cited

U.S. PATENT DOCUMENTS

| | | | |
|---|---|---|---|
| 5,042,730 A * | 8/1991 | Hundt | B02C 18/143 |
| | | | 144/176 |
| 5,063,707 A * | 11/1991 | Antill | A01G 13/0287 |
| | | | 47/9 |
| 5,113,640 A * | 5/1992 | Colistro | A01D 34/66 |
| | | | 56/13.6 |
| 5,226,376 A | 7/1993 | Shaw | |
| 5,236,051 A * | 8/1993 | Sawyer | A01G 13/0287 |
| | | | 171/45 |
| 5,386,876 A * | 2/1995 | Lavo | A01G 13/0287 |
| | | | 171/25 |
| 5,452,652 A * | 9/1995 | Brooks | A01G 13/0287 |
| | | | 100/100 |
| 5,635,224 A | 6/1997 | Brooks | |
| 5,956,923 A | 9/1999 | Andros et al. | |
| 6,308,455 B2 | 10/2001 | Clarke et al. | |
| 7,594,377 B1 * | 9/2009 | Jansen | A01D 34/006 |
| | | | 56/10.2 H |
| 8,302,699 B2 * | 11/2012 | Rocca | A01B 77/00 |
| | | | 171/45 |
| 8,746,360 B2 * | 6/2014 | Rocca | A01G 13/0287 |
| | | | 171/45 |
| 2006/0016460 A1 | 1/2006 | Cozart, Jr. | |
| 2009/0277149 A1 | 11/2009 | Adkins | |
| 2011/0000687 A1 * | 1/2011 | Rocca | A01B 77/00 |
| | | | 171/138 |

FOREIGN PATENT DOCUMENTS

| | | | | |
|---|---|---|---|---|
| FR | 2562382 A1 * | 10/1985 | | A01G 13/0287 |
| FR | 2676614 B1 * | 8/1993 | | A01G 13/0287 |
| FR | 2703212 A1 * | 10/1994 | | A01G 13/0287 |
| FR | 2706734 A1 * | 12/1994 | | A01G 13/0287 |
| FR | 2735654 A1 * | 12/1996 | | A01G 13/0287 |

* cited by examiner

AGRICULTURAL IMPLEMENT FOR RECOVERY OF PLASTIC MULCH AND PROCESSING OF THE SAME

BACKGROUND OF THE INVENTION

It is known in the agricultural industry to utilize plastic sheeting or film—referred to as "plastic mulch"- to utilize for a variety of applications, including fumigation and for covering plant and soil. Plastic mulch is commonly used in growing strawberries and vegetables. The plastic mulch insulates the plants, assisting in maintaining a consistent temperature and humidity of the soil, preventing evaporation of moisture from the soil, and limiting weed growth and erosion. The plastic mulch remains in place for the duration of the cultivation of the plant.

When utilized as a covering, a plastic film having a thickness ranging from 0.6 to 2.0 mils placed over the ground or plants, with a typical thickness of 1.1 to 1.5 mils. Holes may be placed in the film for the plants to grow through. The edges of the plastic mulch are typically tucked under the edges of the bed to maintain the sheeting in place, forming a skirt on either side of the bed.

Upon completion of the growing season and harvesting of the crop, the plastic mulch must be recovered from the field to allow the preparation of the soil for a new crop. Typically, the recovery of the plastic mulch first requires that any vegetation which has grown over the top of the sheeting be removed. One process of vegetation removal is mowing the vegetation, typically with some type of rotary mower. In addition, the skirt portion of the plastic mulch must be free to allow the sheeting to be removed. The process can be further complicated by soil and debris which fall to the center of the plastic mulch during the process of mowing or releasing the skirt, making the material even more difficult to pick up. Because of this issue, some growers will slice the plastic mulch down the center prior to retrieval to allow the dirt and debris to fall through the plastic as it is picked up. The removal of the plastic mulch can be further complicated by the presence of drip irrigation tubing below the plastic mulch, which is typically removed at the same time the plastic mulch is removed.

Because of the intense manpower required to manually remove the plastic mulch, a variety of devices have been developed over the years to facilitate the process. For example, some devices utilize coulter wheels to cut into the ground and any plant material and blades mounted rearward of the coulter wheels, where the blades cut into the ground and underneath the plastic mulch. As the plastic mulch is unearthed, it is left lying loosely upon the planting bed for subsequent collection. With some devices, the unearthed plastic mulch is rolled onto rotating rollers as it is gathered. However, operation of these devices typically requires that vegetation growing above the plastic mulch be first removed before use of the device. These devices also typically do not have the capacity to remove irrigation tubing at the same time. These devices typically result in bundles or rolls of plastic mulch which must thereafter be disposed. It would be desirable to have a machine which is capable in a single pass of performing all aspects required to recover plastic mulch and irrigation tubing, including even the shredding and bagging of the recovered material.

SUMMARY OF THE INVENTION

Embodiments of the disclosed invention provide an answer to the above-described need. Embodiments of the present invention are capable of performing some or all of the following functions in the recovery of the plastic mulch: (1) mowing any vegetation growing above the plastic mulch to within ¼" of the top surface of the plastic mulch with a mowing head; (2) cleaning the top surface of the plastic mulch of any dirt or vegetative debris; (3) loosening the soil around the skirt of the plastic mulch to free the skirt for removal; (4) lifting the skirt; (5) lifting the plastic mulch from the ground surface and conveying the plastic material to a plastic material receiving bin; (6) shredding the plastic material; (7) placing the shredded plastic mulch into a flexible storage receptacle; (8) compressing and compacting the flexible storage receptacle to facilitate transportation and storage; and (9) disking the ground surface in preparation for the next crop.

Embodiments of the disclosed invention provide a mobile agricultural plastic processing apparatus which recovers a plastic sheet material (i.e., plastic mulch), which is utilized in growing a crop, where a portion of the crop penetrates and grows above the plastic mulch. One embodiment of the apparatus comprises a frame which has a front and a rear. A control center and ground engaging wheels are attached to the frame. At least one mower head is suspended from the frame, where the mower head is deployable to cut the portion of crop above the plastic sheet material. The mower head may comprise a plurality of helix shaped blades attached to a rotable shaft. Alternatively, the mower head may comprise a rotary blade attached to a rotatable shaft. A first power mechanism, such as a hydraulic or electric motor or and engine, is coupled to the rotatable shaft to provide the rotation of the shaft and mower blades as desired, with control of the first power mechanism being provided at the control center.

Behind or rearward of the mower head is a plastic mulch lifting apparatus, which is attached within the frame. The plastic mulch lifting apparatus has at least one lifting head which may be positioned either manually or by control to be at a level to engage the plastic mulch after the portion of crop above the plastic mulch has been cut by the mower head. The plastic mulch lifting apparatus may also have a pair of opposite facing rotatable continuous belts which grasp the plastic mulch between the opposite facing continuous belts and lift the plastic mulch upwardly to a plastic mulch receiving bin. A second power mechanism rotates the opposite facing continuous belts.

Another embodiment of the invention may include a plastic mulch cleaning apparatus which is disposed between the mower head and the plastic mulch lifting apparatus. The plastic mulch cleaning apparatus has means for cleaning a top facing surface of the plastic mulch, which may have dirt or vegetative debris on top of it. The means for cleaning the top facing surface may include an air jet assembly in which air is pumped through a nozzle to blow off any debris from the top facing surface of the plastic mulch. Alternatively, a mechanical apparatus may be employed. For example, the means for cleaning the top facing surface may include a plurality of brush members which are mounted on a transversely mounted continuous belt which is rotated by a power mechanism. The brushes will travel at the same linear velocity as the apparatus itself.

Another embodiment of the invention may include a plastic mulch shredding mechanism which may be set within the plastic mulch receiving bin. The plastic mulch shredding mechanism may comprise a plurality of rotating teeth mounted on a rotatable shaft. The plastic mulch shredding mechanism may further comprise a plurality of stationary teeth, where the stationary teeth are intermeshed with the plurality of rotating teeth, where the stationary teeth remain stationary as the rotating teeth rotate upon the rotatable shaft.

The shredded plastic mulch generated from the plastic mulch shredding mechanism may be transported through a flexible conduit, where the first end of the flexible conduit is adjacent to the plastic mulch receiving bin, and a blower blows the shredded plastic mulch into the conduit. A second end of the conduit may be connected to a flexible receptacle which receives the shredded plastic mulch. The apparatus may have a compaction apparatus comprising a stationary plate and a compression member, where the compression member compresses the flexible receptacle against the stationary plate.

Another embodiment of the invention may include a skirt lifting apparatus which is attached to one or both sides of the frame. The skirt lifting apparatus may comprise a blade member attached to a pivot arm such that the blade member swings from a first outward position to a second inward position and back again, where the first outward position is generally adjacent to the skirt. As the blade pivots, it frees up the skirt and pushes the skirt toward the center of the plastic mulch, freeing the skirt of soil which has been deposited over the skirt.

In another embodiment of the skirt lifting apparatus, a blade member is used to free the skirt of the plastic mulch from soil which has been deposited over the skirt. Behind the blade is a continuous belt mounted on rollers, where the face of the belt is positioned to lift upwardly on side of the plastic mulch to facilitate lifting of the plastic mulch from the ground surface from the ground surface by the plastic mulch lifting apparatus

REFERENCE NUMBERS UTILIZED IN THE DRAWINGS

Figure 1:
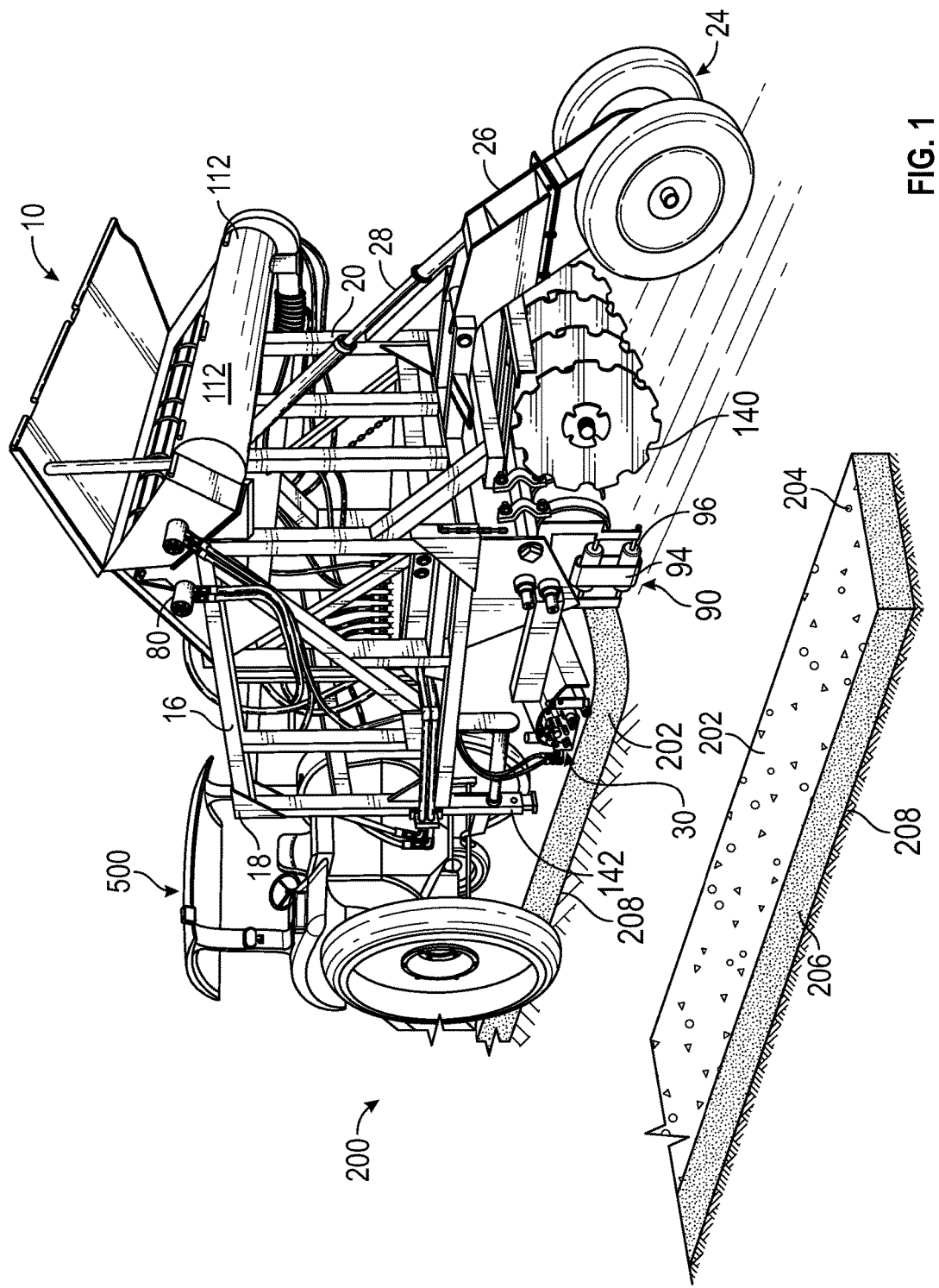
FIG. 1 depicts a left side perspective view of an embodiment of the invention in operation connected to a tractor.

10 Agricultural implement for recovering and processing plastic mulch.
12 Hydraulic reservoir.
14 Hydraulic controls
16 Frame.
18 Front of the frame
20 Back of the frame
22 Control center
24 Ground engaging wheels
26 Wheel yoke.
28 Hydraulic ram
30 Mower heads.
32 Reel blade package.
34 Helix shaped blades.
36 Rotatable shaft.
38 Bed knife
40 Hydraulic motor for mower head
42 Mower head roller
50 Plastic mulch cleaning apparatus.
52 Brushes for plastic mulch cleaning apparatus
54 Transversely mounted continuous belt.
56 Rollers for transversely mounted continuous belt.
58 Hydraulic motor for transversely mounted continuous belt.
70 Plastic mulch lifting apparatus.
72 Lifting head.
74 Front belt.
76 Rear belt.
78 Transverse ribs.
80 Hydraulic motors for powering plastic mulch lifting apparatus.
82 Front upper roller.
84 Rear upper roller.
86 Front lower roller.
88 Rear lower roller.
90 Skirt lifting apparatus.
92 Blade member for skirt lifting apparatus.
94 Continuous belt for skirt lifting apparatus.
96 Rollers for continuous belt for skirt lifting apparatus.
100 Alternative embodiment of skirt lifting apparatus.
102 Blade member for alternative embodiment.
104 Pivot arm for alternative embodiment.
106 Pulleys for alternative embodiment.
108 Belts for alternative embodiment.
110 Plastic mulch shredding apparatus.
112 Plastic mulch receiving bin.
114 Blower.
116 Flexible conduit.

118 Flexible receptacle.
120 Rotating teeth
122 Rotatable shaft for plastic mulch shredding mechanism
124 Stationary teeth
126 Hydraulic motor
130 Compaction apparatus.
132 Stationary plate
134 Compression plate
136 Hydraulic ram for actuating compaction apparatus.
140 Disc
142 Adjustable length legs.
200 Field
202 Plastic Mulch.
204 Vegetation.
206 Plastic mulch skirt
208 Bed
500 Tractor

DETAILED DESCRIPTION OF THE INVENTION

Referring now to the figures, FIGS. 1-7 depict embodiments of the disclosed agricultural implement 10 showing various features of the invention. While the embodiments depicted in the figures show a towable implement being towed by a tractor 500, it is to be appreciated a self-propelled embodiment may be fabricated by combining components which are known in the art with the various systems which may be utilized in embodiments of the present invention. Systems which may be utilized in embodiments of the present invention include one or more mower heads 30, a plastic mulch cleaning apparatus 50, a plastic mulch lifting apparatus 70, a skirt lifting apparatus 90, 100, a plastic mulch shredding apparatus 110, and a compaction apparatus 130.

FIG. 1 depicts an embodiment of the disclosed agricultural implement 10 in operation being towed by a tractor 500 through field 200 over a bed 208 which has been covered with plastic mulch 202, with an adjacent bed 208 ready for removal of the plastic mulch 202. Agricultural implement 10 may be fabricated to process multiple beds 208 simultaneously by utilizing multiple mower heads 30, plastic mulch lifting apparatus 70, etc., as discussed in further detail below. Vegetation 204 extends through holes in the plastic mulch 202, such that a layer of vegetation 204 covers the top surface of the plastic mulch 202. The apparatus includes a frame 16 having a front 18 and a back 20, a control center 22, and ground engaging wheels 24 attached to the frame or to a wheel yoke 26. A hydraulic ram 28 may be placed between the wheel yoke 26 and frame 16 which allows an operator to control the elevation of the agricultural implement 10 with respect to ground level. As the agricultural implement 10 moves through the field 200, mower heads 30 cut the vegetation 204 which extends above the top surface of the plastic mulch 202, leaving the plastic mulch 202 and a very short amount of vegetation 204 growing above the top surface of the plastic mulch.

The agricultural implement 10 may have a plastic mulch cleaning apparatus 50 set behind the mower heads 30. The plastic mulch cleaning apparatus 50 removes debris which has accumulated on top of the plastic mulch 202, such as vegetation cuttings resulting from the mowing operation or dirt. The agricultural implement 10 also has a plastic mulch lifting apparatus 70 which is set behind the mower heads 30 and, if applicable, the plastic mulch cleaning apparatus. If the plastic mulch 202 has a skirt 206, which typically is covered by soil, the agricultural implement 10 may also have a skirt lifting apparatus 90, 100 which frees up the skirt 206 of the plastic mulch before the plastic mulch 202 is pulled up into the plastic mulch lifting apparatus 70. The plastic mulch lifting apparatus 70 lifts the plastic mulch 202 upward from the ground level, allowing any remaining dirt or debris to fall downward. The plastic mulch lifting apparatus 70 lifts the plastic much 202 upward until it reaches a plastic mulch receiving bin 112, into which the plastic mulch 202 is deposited. A plastic mulch shredding apparatus 110 may be contained within the plastic mulch receiving bin 112. Once the plastic mulch 202 is shredded, it may be blown by blower 114 from the plastic mulch receiving bin 112 into flexible conduit 116 and deposited into flexible receptacle 118. Given the substantial compressibility of the shredded plastic mulch, a compaction apparatus 130 may be utilized to compress the flexible receptacle 118 to facilitate collection, transport and storage of the shredded plastic mulch. Each of the above systems is hereafter described in greater detail.

Agricultural implement 10 may utilize a plurality of hydraulic motors and controls for operating each of the systems. Agricultural implement 10 may comprise a hydraulic reservoir 12 and pumps, not shown, for operating the hydraulic motors and hydraulic rams which drive or actuate the various systems. Control of each of the systems may be conducted by an individual standing on a platform within the control center 22. At this position, the individual may operate a variety of hydraulic controls 14 which control the operation of the various systems of the agricultural implement 10 by operation of hydraulic motors, hydraulic rams, and other actuated devices.

Figure 9:
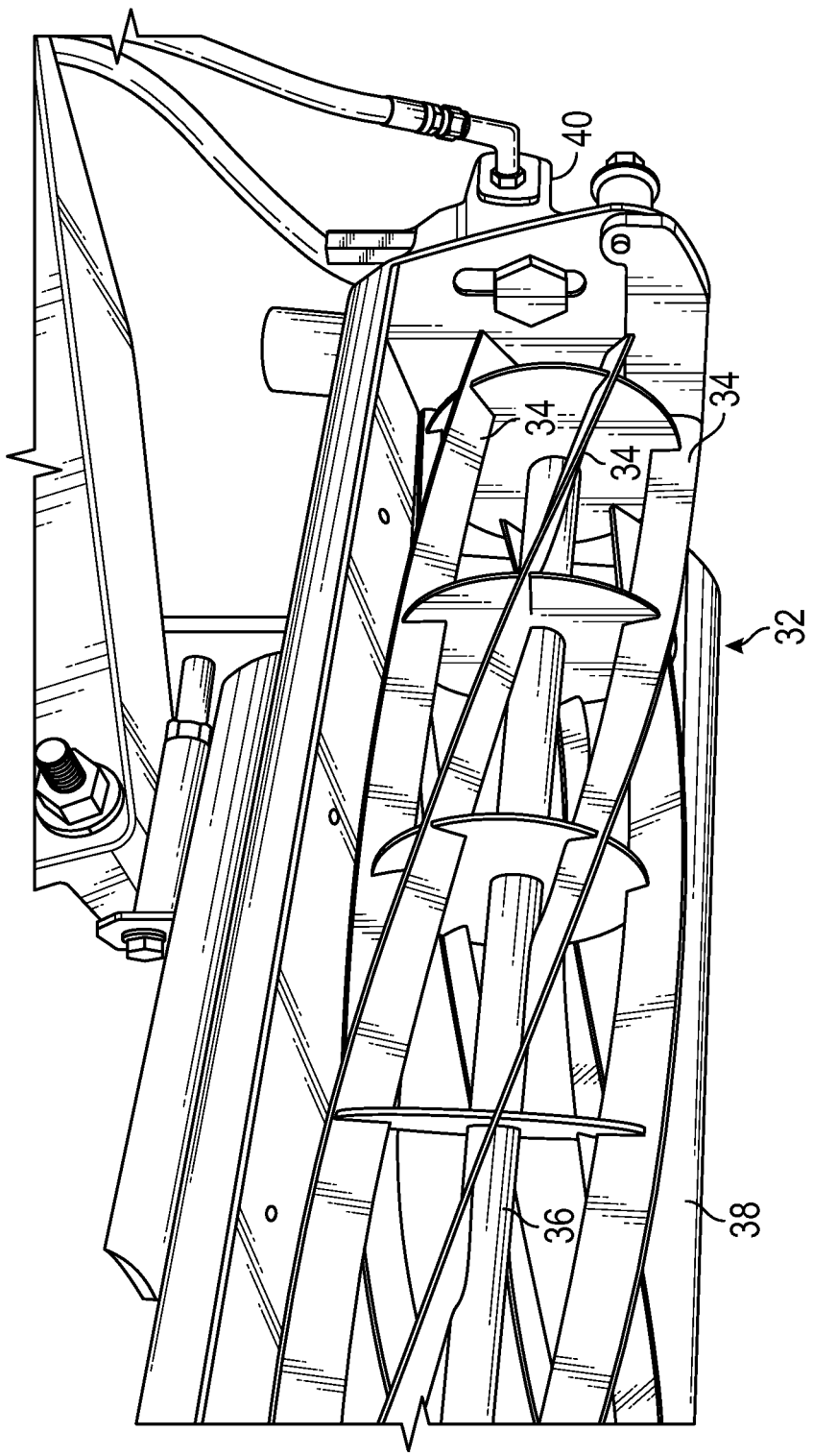
FIG. 9 shows a close-up view of an embodiment of a mowing head utilizing a reel blade.
Figure 10:
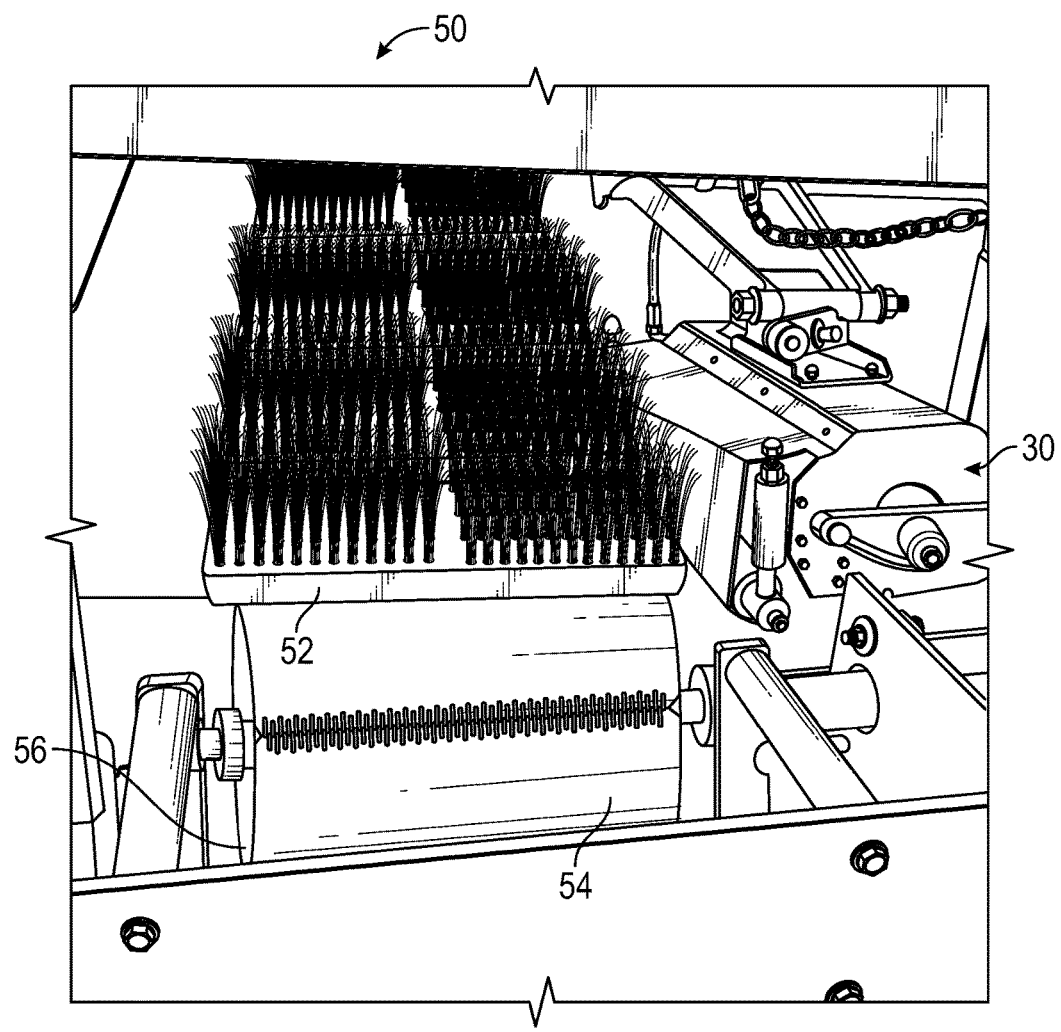
FIG. 10 shows a close-up view of an embodiment of a plastic mulch cleaning apparatus which may be utilized in embodiments of the invention, showing a plurality of cleaning brushes mounted on the top of a continuous belt
Figure 11:
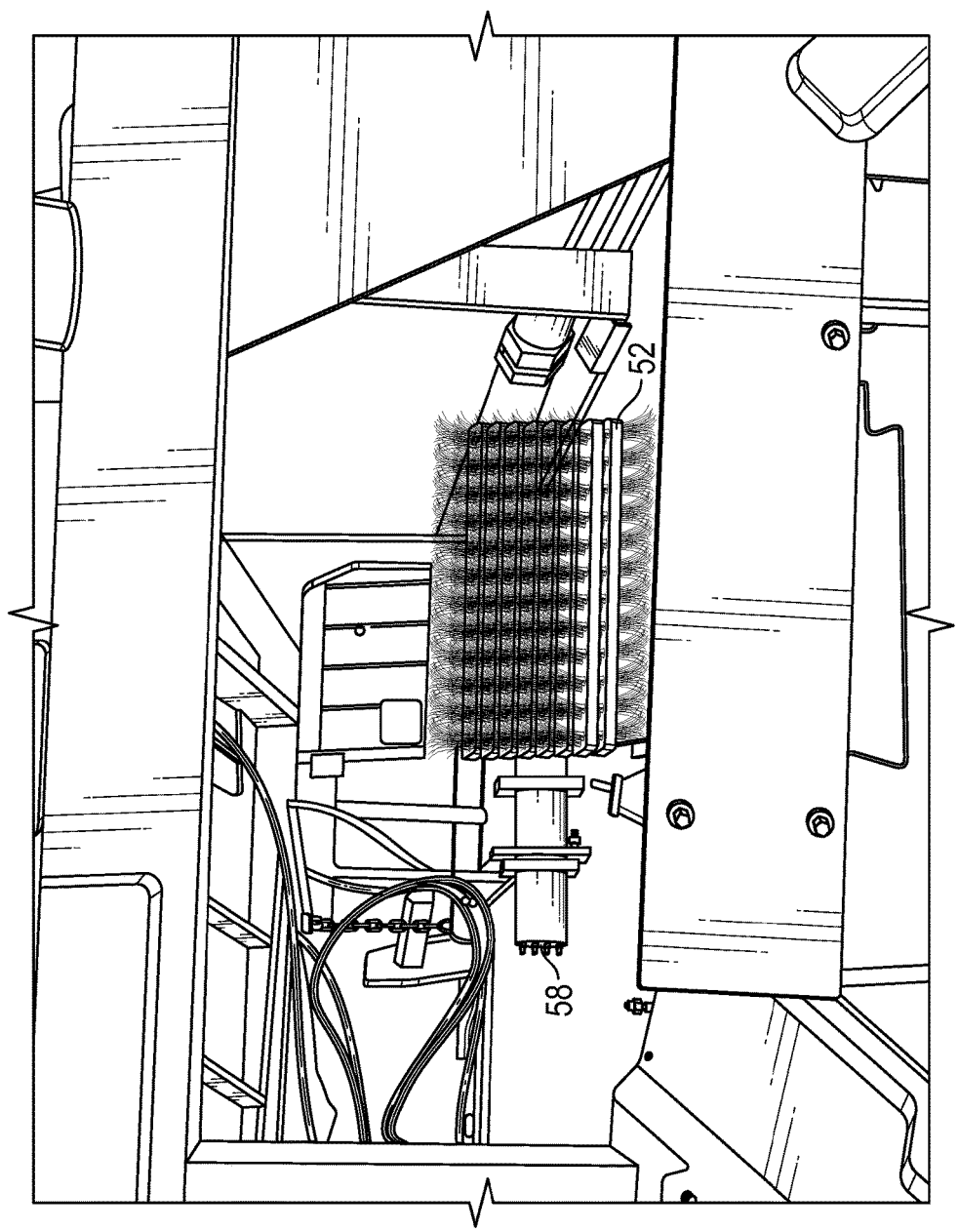
FIG. 11 shows another close-up view of an embodiment of a plastic mulch cleaning apparatus which may be utilized in embodiments of the invention.
Figure 12:
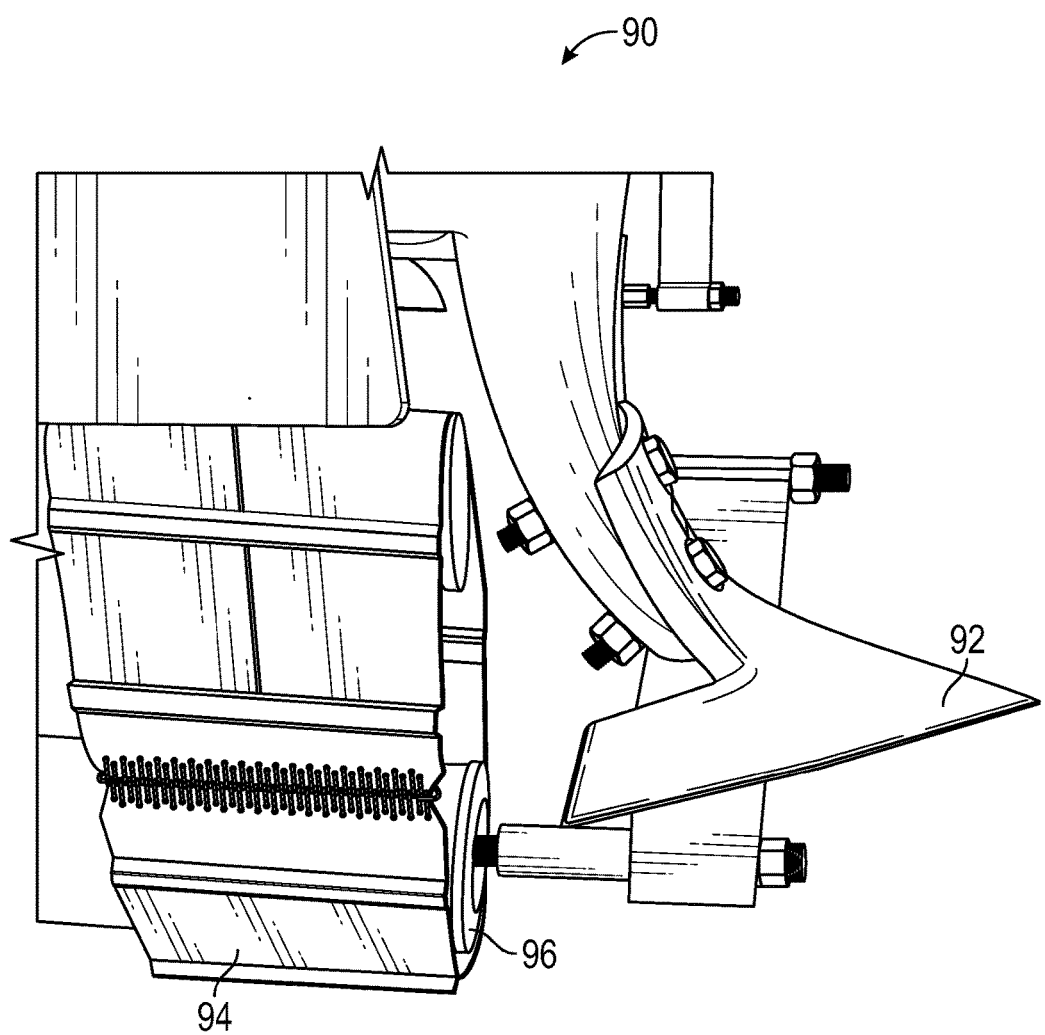
FIG. 12 shows a close-up view of an embodiment of a skirt lifting apparatus which may be utilized in embodiments of the invention.

A first system found in embodiments of the invention comprises deployable mower heads 30 which are attached to frame 16. Depending upon the width or number of the particular beds 208 to which the agricultural implement 10 is utilized, the invention may have a single mower head 30, or several mower heads which are disposed across the width of the agricultural implement. The mower heads 30 may comprise either rotary blades or reel blades. For the embodiments of the agricultural implement 10 depicted in the attached figures, one or more reel blade packages 32 are utilized for the mower heads 30. A close up view of a reel blade package 32 is depicted in FIG. 9. The reel blade package 32 comprises a plurality of helix shaped blades 34 which are attached to a rotatable shaft 36. A bed knife 38 is disposed at the bottom of the reel blade package 32. The reel blade package 32 may have a width of approximately thirty inches. Rotatable shaft 36 is rotated by a power mechanism, such as a hydraulic motor 40. Mower head 30 may have an adjustable elevation, and will typically be capable of trimming the vegetation to a height of ¼" to 1" above the top surface of the plastic mulch 202. The height of the mower heads 30 may be set to track the height of mower head roller 42, which is adjustable and will typically be set to the height of the top surface of the plastic mulch 202.

A second system which may be utilized in embodiments of the invention is the plastic mulch cleaning apparatus 50. One type of mulch cleaning apparatus may comprise one or more air nozzles which apply high pressure air to blow debris off of the top surface of the plastic mulch 202, where the high pressure air is provided by either an onboard compressor and/or air storage bottles. Alternatively, a mechanical cleaning system may be employed, such as that depicted in the figures. The plastic mulch cleaning apparatus 50 shown in the figures has a plurality of spaced-apart brushes 52 which are mounted on a transversely mounted continuous belt 54 which are mounted on rollers 56. The transversely mounted continuous belt 54 may be driven by hydraulic motor 58. The inventor herein has found that rollers having a diameter of eight inches provide acceptable service for this application. The brushes 52 may be mounted on the transversely mounted continuous belt such that the brushes are spaced at twelve inches from center to center. The speed of the transversely mounted continuous belt 54 may be controlled by the operator and will typically operate at the same linear speed as the forward linear speed of the agricultural implement 10.

Another system which may be utilized in embodiments of the invention is the plastic mulch lifting apparatus 70, which is disposed rearwardly from the mower heads 30 and the plastic mulch cleaning apparatus 50. The plastic mulch 202 which is fed into the plastic mulch lifting apparatus 70 will typically have little or no vegetation 204 or debris on the top surface of the plastic mulch because such vegetation and debris will already have been removed by the mower heads 30 and the plastic mulch cleaning apparatus 50. If the plastic mulch 202 has a skirt 206, such skirt will have been freed by operation of the skirt lifting apparatus 90, 100 described below, which apparatus is set forward of the plastic mulch lifting apparatus 70. The plastic mulch lifting apparatus 70 first directs a sheet of the plastic mulch 202 upward and then grasps the plastic mulch and conveys it upward for disposition into the plastic mulch receiving bin 112.

Figure 14:
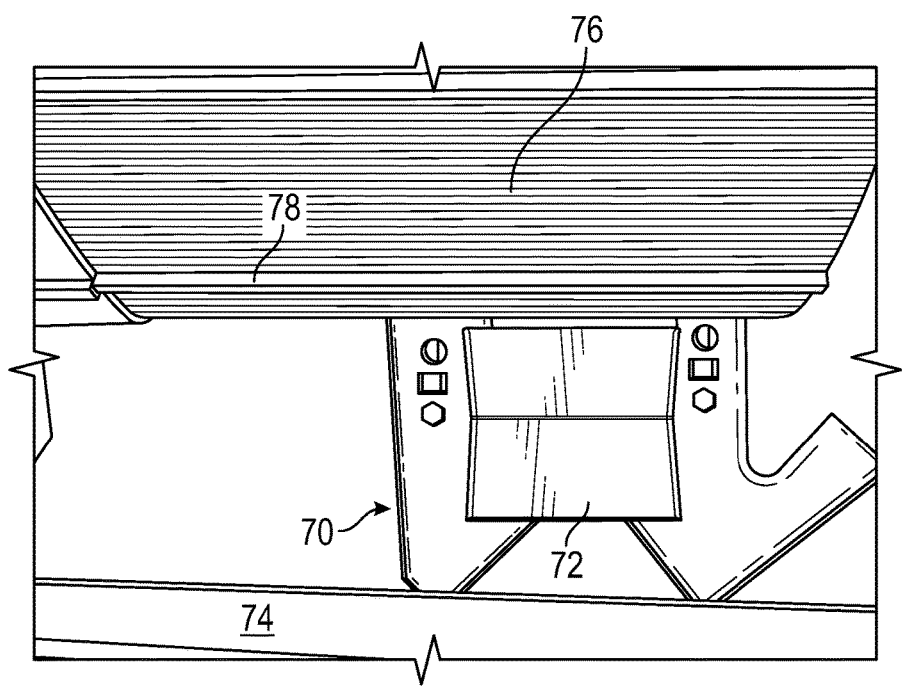
FIG. 14 shows a close-up downward view of an embodiment of a plastic mulch lifting apparatus, showing the lifting head disposed below two opposite facing rotatable continuous belts which have been separated to provide a view of the lifting head.

As shown in the figures, an embodiment of the plastic mulch lifting apparatus 70 comprises one or more lifting heads 72. The lifting head 72 is generally in a scooped configuration which engages the bottom facing surface of the plastic mulch 202 and directs it upwardly so that the plastic mulch may be fed between two opposite facing continuous belts, front belt 74 and rear belt 76. FIG. 14 shows a front view of the plastic mulch lifting apparatus 70, the relative positions of lifting head 72 and front belt 74. There is a gap between the lifting head 72 and the bottom of front belt 74 sufficient to allow passage of the plastic mulch 202 past front belt 74, to be fed between front belt 74 and rear belt 76. Front belt 74 and rear belt 76 may each have a plurality of transverse ribs 78 which assist in gripping the plastic mulch 202.

FIG. 14 looks downwardly toward lifting head 72 and between front belt 74 and rear belt 76. The gap between the belts in FIG. 14 is exaggerated to allow the viewing of the lifting head 72. In operation, front belt 74 and rear belt 76 are practically touching. Front belt 74 spans generally vertically between a front upper roller 82 and a front lower roller 86. Likewise, rear belt 76 spans generally vertically between a rear upper roller 84 and a rear lower roller 88. Front upper roller 82 and rear upper roller 84 are disposed within the plastic mulch receiving bin 112 at the top of the unit so that the plastic mulch 202 conveyed upwards between front belt 74 and rear belt 76 is disposed within the plastic mulch receiving bin 112. Front lower roller 86 and rear lower roller 88 are disposed toward the bottom of the agricultural implement 10 to place the lower reach of front belt 74 and rear belt 76 adjacent to lifting head 72, to facilitate grasping of the plastic mulch 202 between the two belts as the plastic mulch is directed upward by the lifting head.

Hydraulic motors 80 may be utilized to rotate either or both of power front upper roller 82 and rear upper roller 84. Any or all of front upper roller 82, rear upper roller 84, front lower roller 86 and rear lower roller 88 may comprise ribs to improve the grip between the rollers and the belts 74, 76. It is to be noted that in some cases, irrigation tubing may be set beneath the plastic mulch 202. In such cases, the lifting head 72 will direct the irrigation tubing upward to be grasped between the belts 74, 76. The irrigation tubing can be processed in the same manner as the plastic mulch 202.

Figure 15:
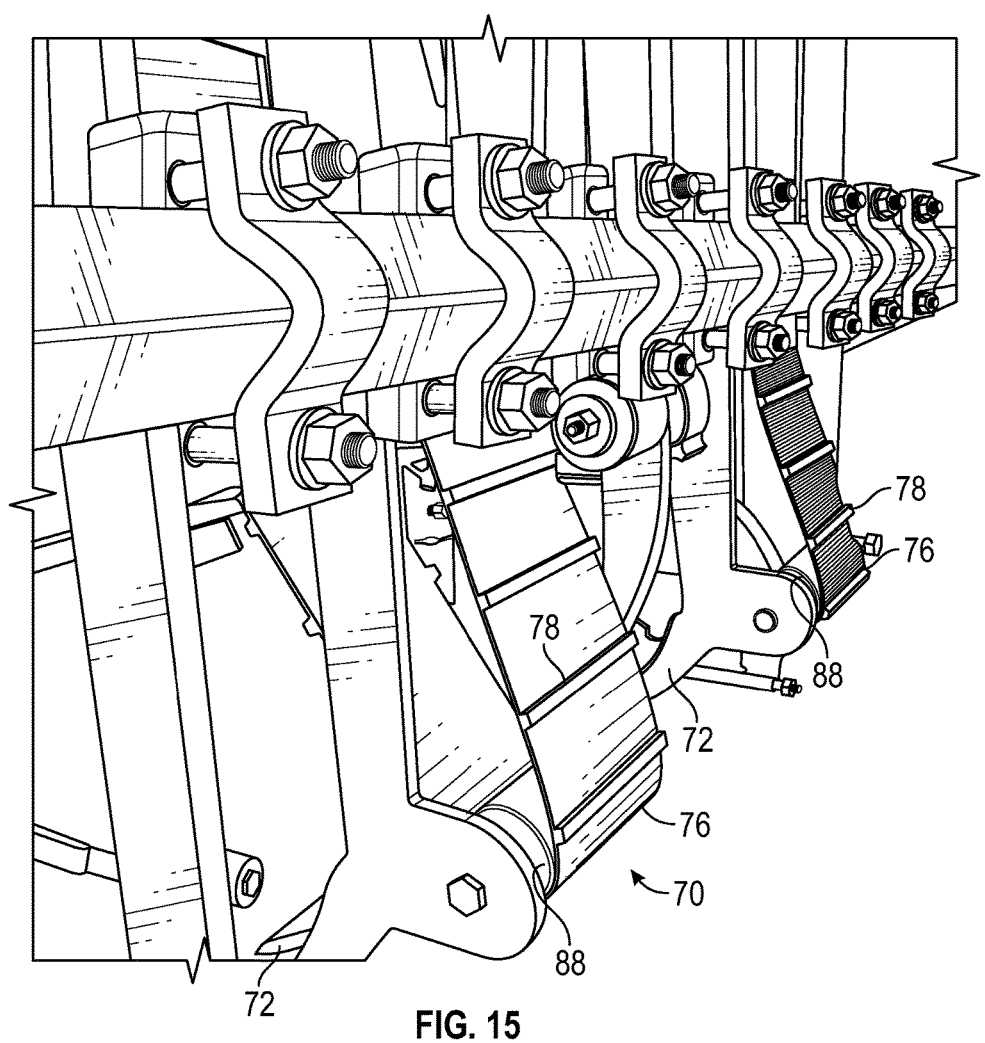
FIG. 15 shows a close-up view of the rear of an embodiment of a plastic mulch lifting apparatus which may be utilized in embodiments of the invention.
Figure 16:
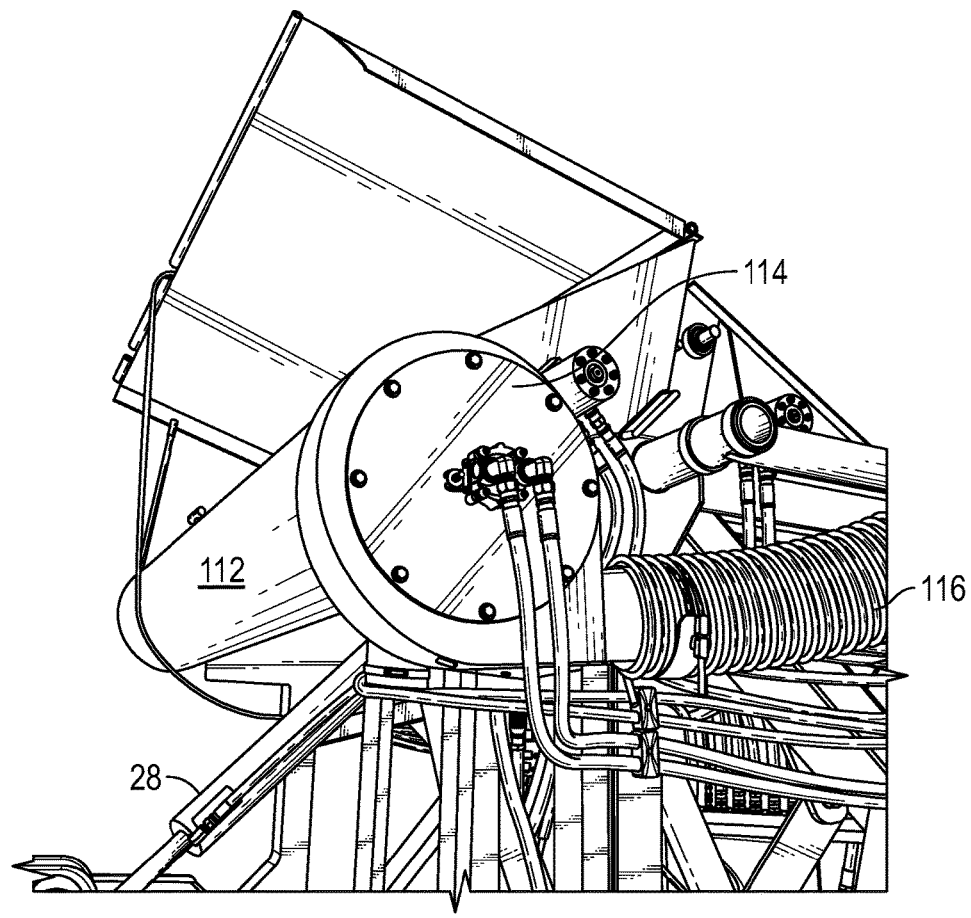
FIG. 16 shows a close-up view of a plastic mulch receiving bin, having a conduit member attached.
Figure 17:
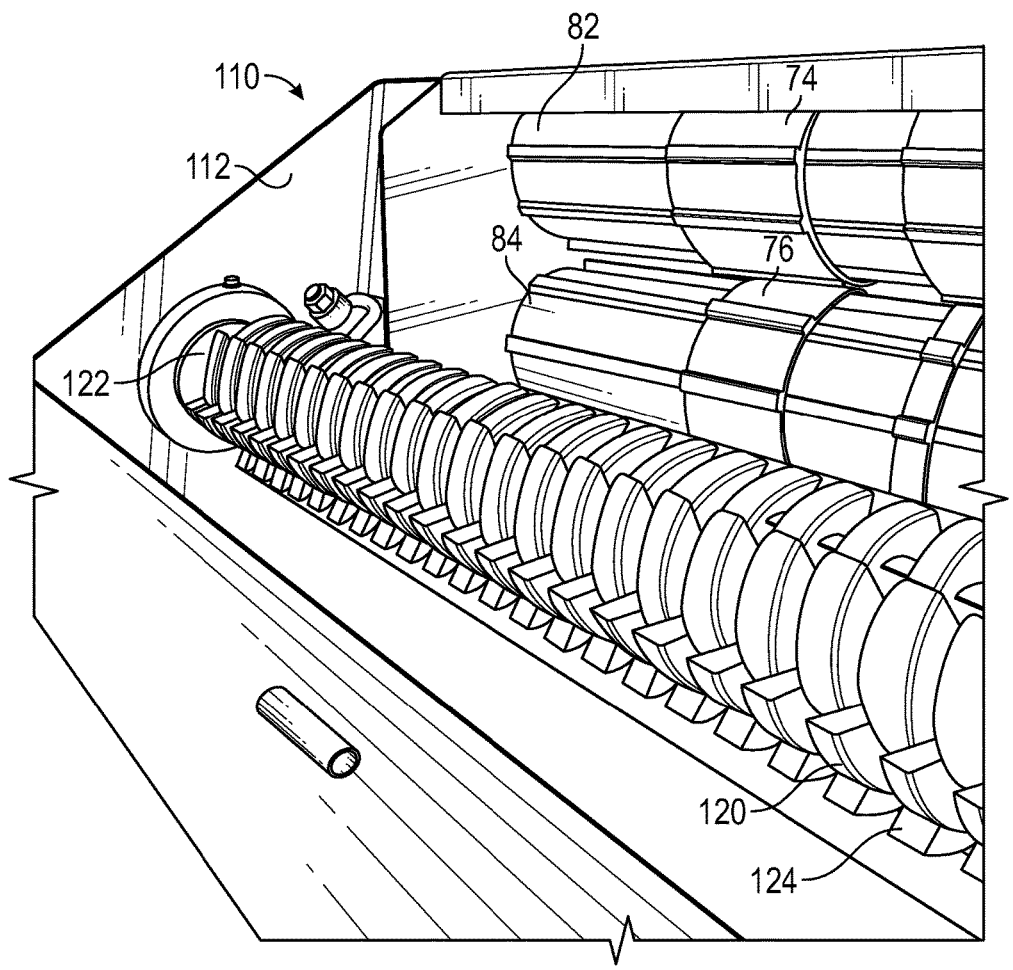
FIG. 17 shows a close-up view of a plastic mulch shredding mechanism contained within the plastic sheet material receiving bin.

A single agricultural implement 10 may have a number of front belts 74 and rear belts 76 depending upon the width of the implement. Multiple front belts 74 may span between a single front upper roller 82 and a single front lower roller 86. Likewise, multiple rear belts 76 may span between a single rear upper roller 84 and a single rear lower roller 88. Alternatively, multiple rollers may be utilized, such as the multiple rear lower rollers 88 as depicted in FIG. 15.

Another system which may be utilized in embodiments of the invention is the skirt lifting apparatus 90. As discussed above, if the plastic mulch 202 has a skirt 206, the skirt may be freed by operation of the skirt lifting apparatus 90 which is set forward of the plastic mulch lifting apparatus 70. The skirt lifting apparatus 90 will typically depend from the frame 16 and may be mounted as depending from either side or both sides of the frame 16. The skirt lifting apparatus 90 may comprise a blade member 92 which may be utilized to loosen the soil immediately adjacent to the plastic mulch skirt 206. Rearward of the blade member 92 is a continuous belt 94 for lifting plastic mulch skirt 206. Continuous belt 94 is mounted on rollers 96. Continuous belt 94 may be powered by a hydraulic motor (not shown). Continuous belt 94 will typically rotate having the same linear speed as the linear speed of the agricultural implement 10. The skirt lifting apparatus 90 may have an adjustable elevation. With this embodiment of skirt lifting apparatus 90, the blade member 92 frees up the skirt 206 and directs it toward continuous belt 94 and directs the skirt upwardly in anticipation of the inward portions of the plastic mulch being lifted by the plastic mulch lifting apparatus 70 described above, which is rearward of the skirt lifting apparatus 90.

Figure 13:
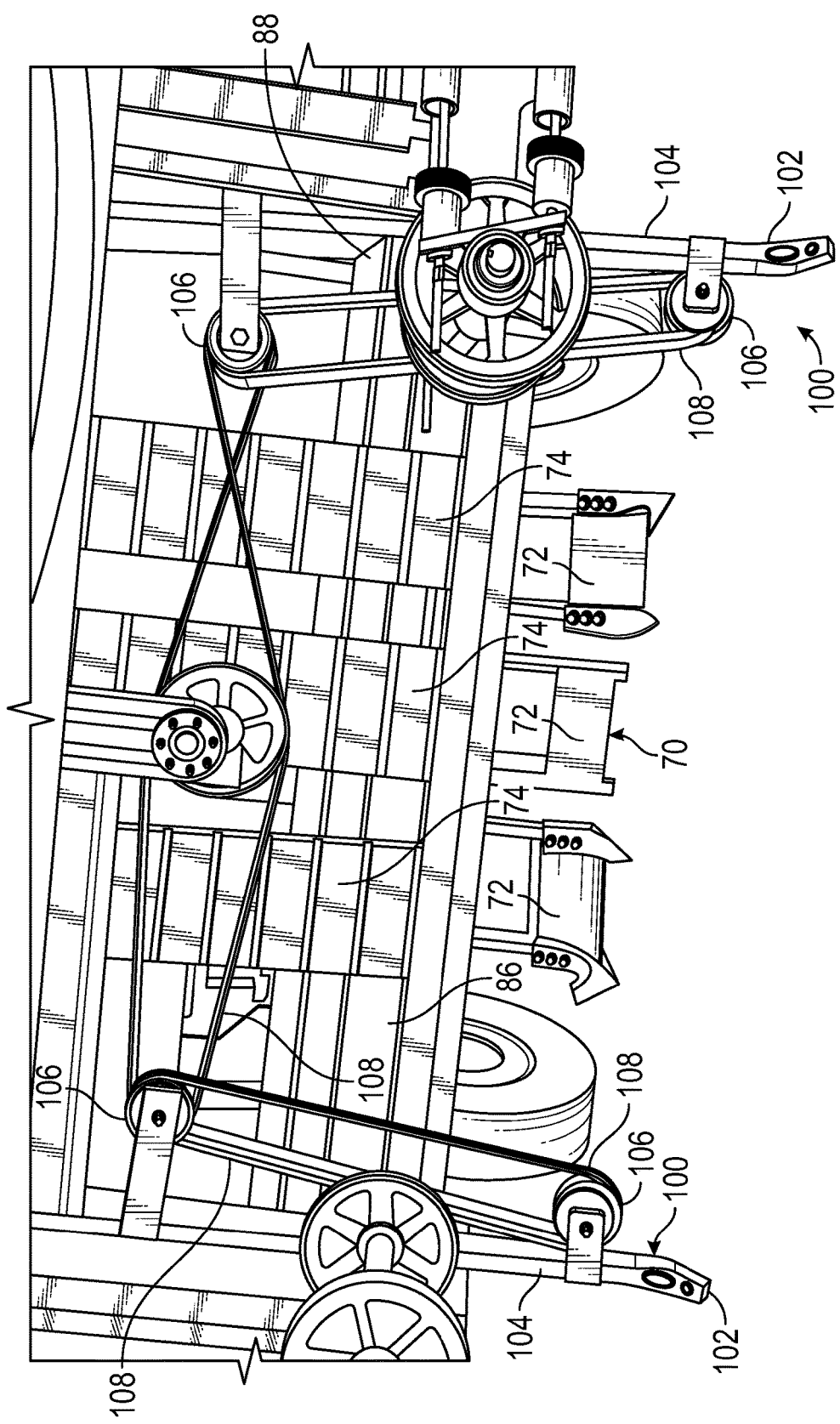
FIG. 13 shows a close-up view of a second embodiment of a skirt lifting apparatus which may be utilized in embodiments of the invention, as well as showing the front of an embodiment of plastic mulch lifting apparatus.

Alternatively, an alternative embodiment of skirt lifting apparatus 100 is depicted in FIG. 13. This embodiment comprises a blade member 102 which is attached to a pivot arm 104. Pivot arm 104 is actuated by a system of pulleys 106 and belts 108 to swing from a first outward position, as depicted in FIG. 13, to an inward position toward the center of the plastic mulch 202. The blade member 102 may also pivot upwardly, such that the blade member frees up the skirt 206 and pulls it upwardly and pushes it toward the center of the agricultural implement 10 in anticipation of the inward portions of the plastic mulch being lifted by the plastic mulch lifting apparatus 70 described above, which is rearward of the skirt lifting apparatus 100.

Another system which may be utilized in embodiments of the invention is a plastic mulch shredding mechanism 110 which is disposed within the plastic mulch receiving bin 112. As plastic mulch 202 is received into plastic mulch receiving bin 112, it may be fed into shredding mechanism 110. Shredding mechanism 110 may have a plurality of rotating teeth 120 mounted on a rotatable shaft 122, where the rotating teeth are intermeshed with a plurality of stationary teeth 124, and the rotating shaft is powered by a power means such as hydraulic motor 126.

Figure 2:
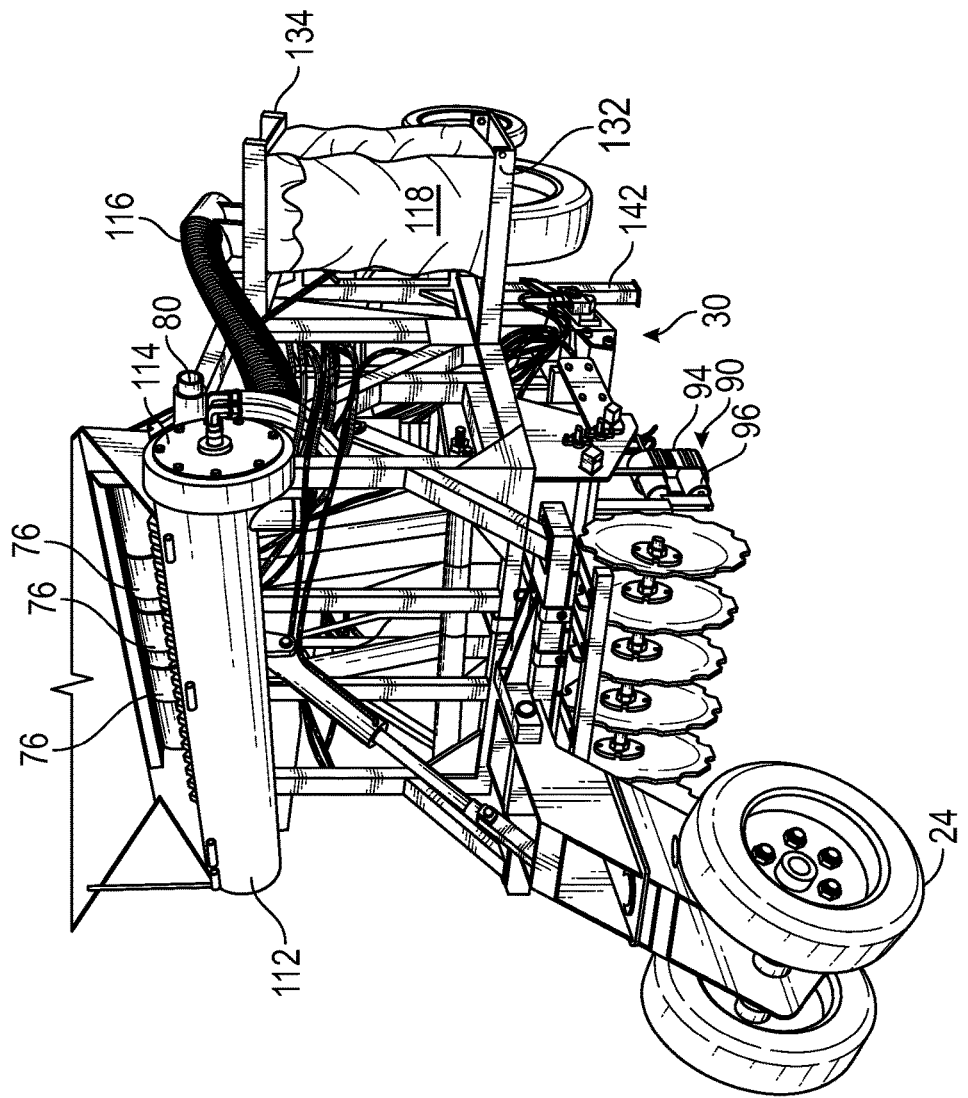
FIG. 2 shows a right side rear perspective view of an embodiment of the invention connected to a tractor.
Figure 3:
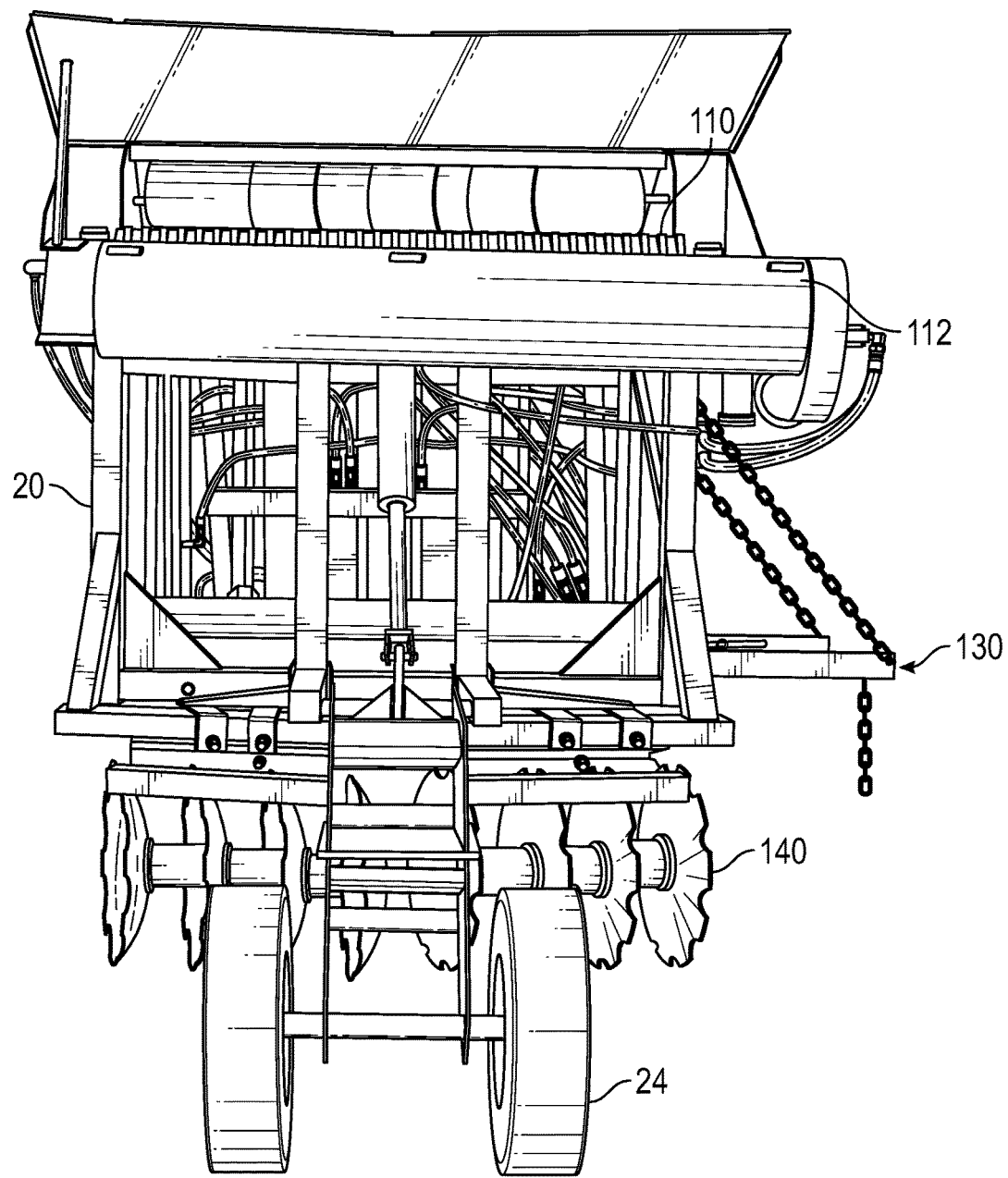
FIG. 3 shows a rear view of an embodiment of the invention.
Figure 4:
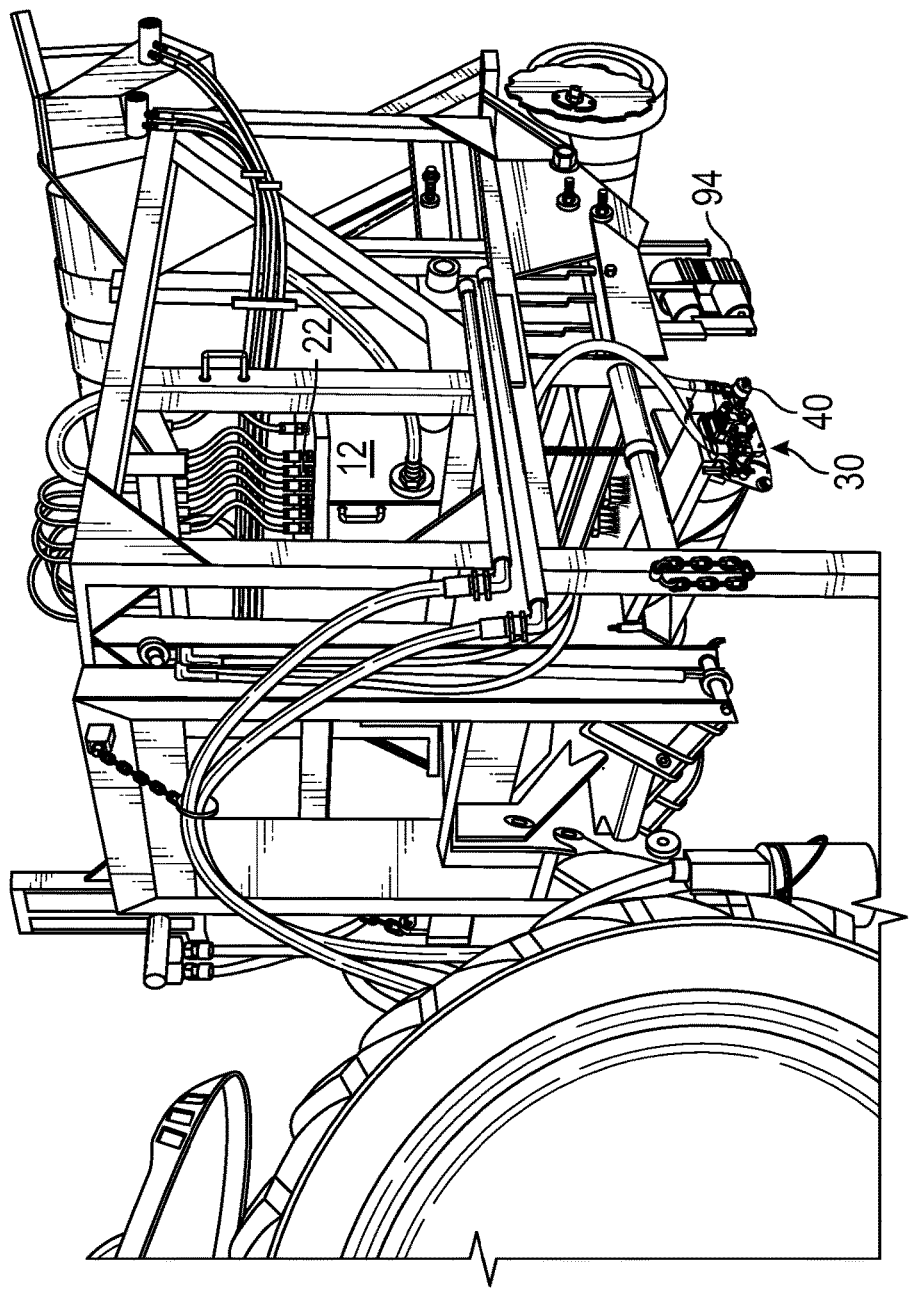
FIG. 4 shows a left side front perspective view of an embodiment of the invention connected to a tractor.
Figure 5:
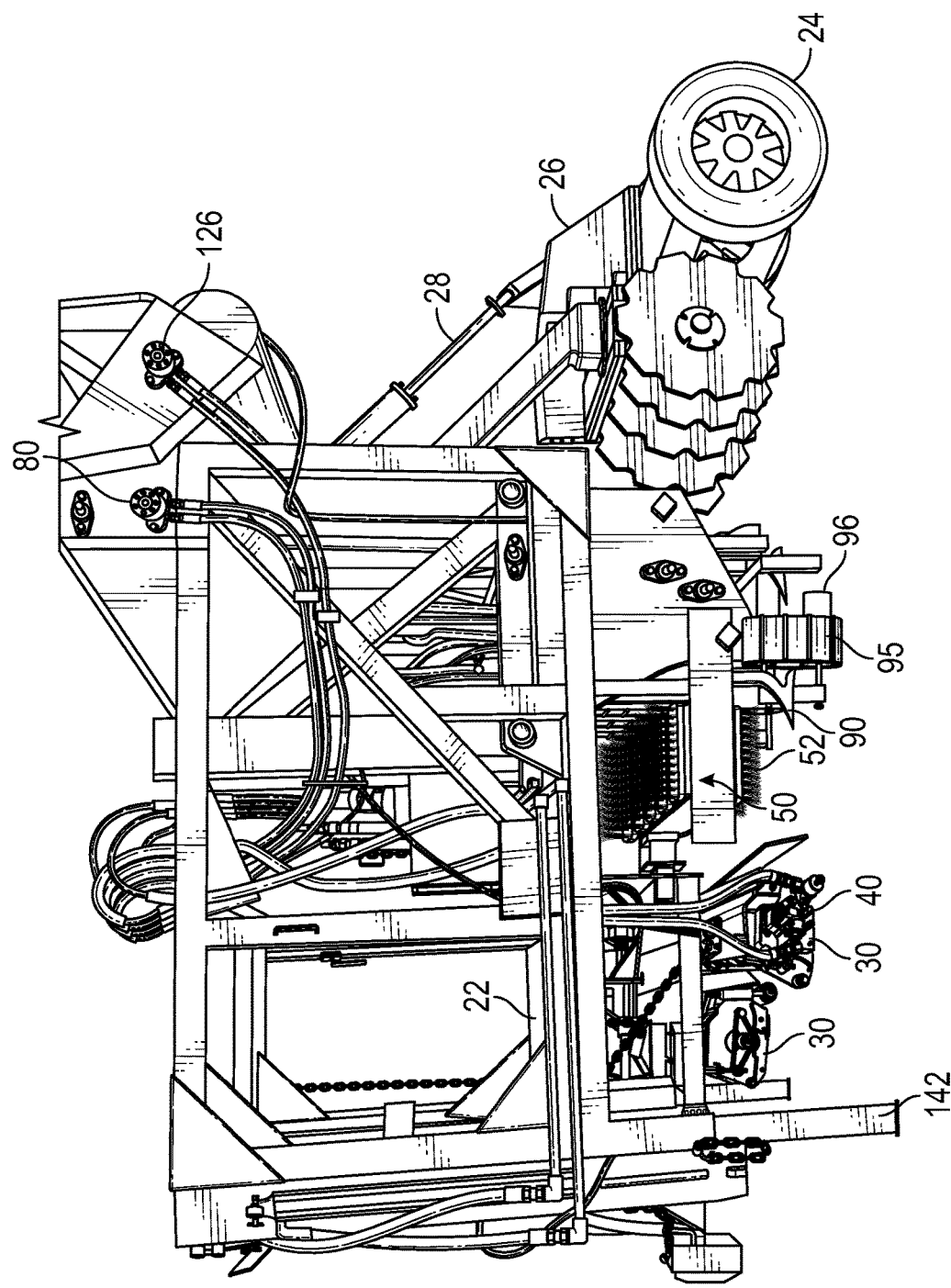
FIG. 5 shows a left side view of an embodiment of the invention.
Figure 6:
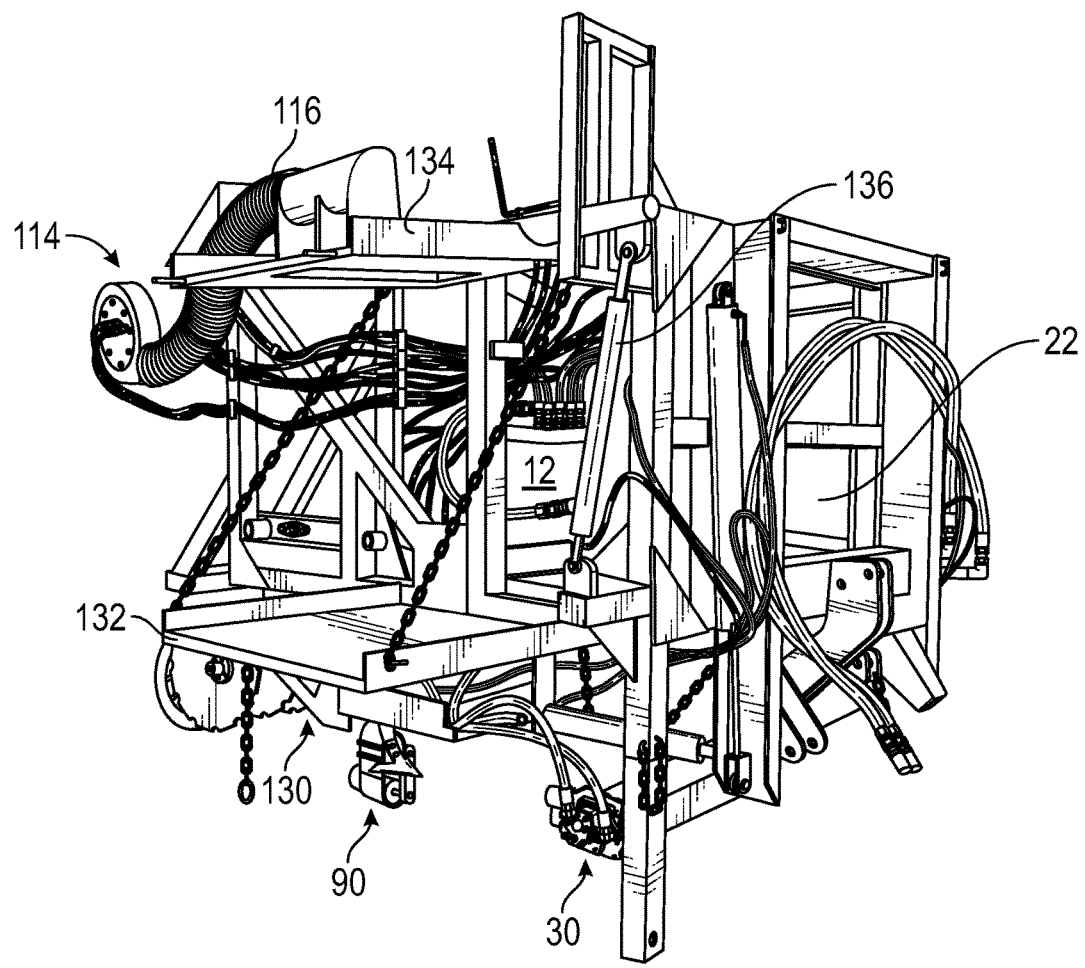
FIG. 6 shows a right side front perspective view of a portion of an embodiment of the invention.
Figure 7:
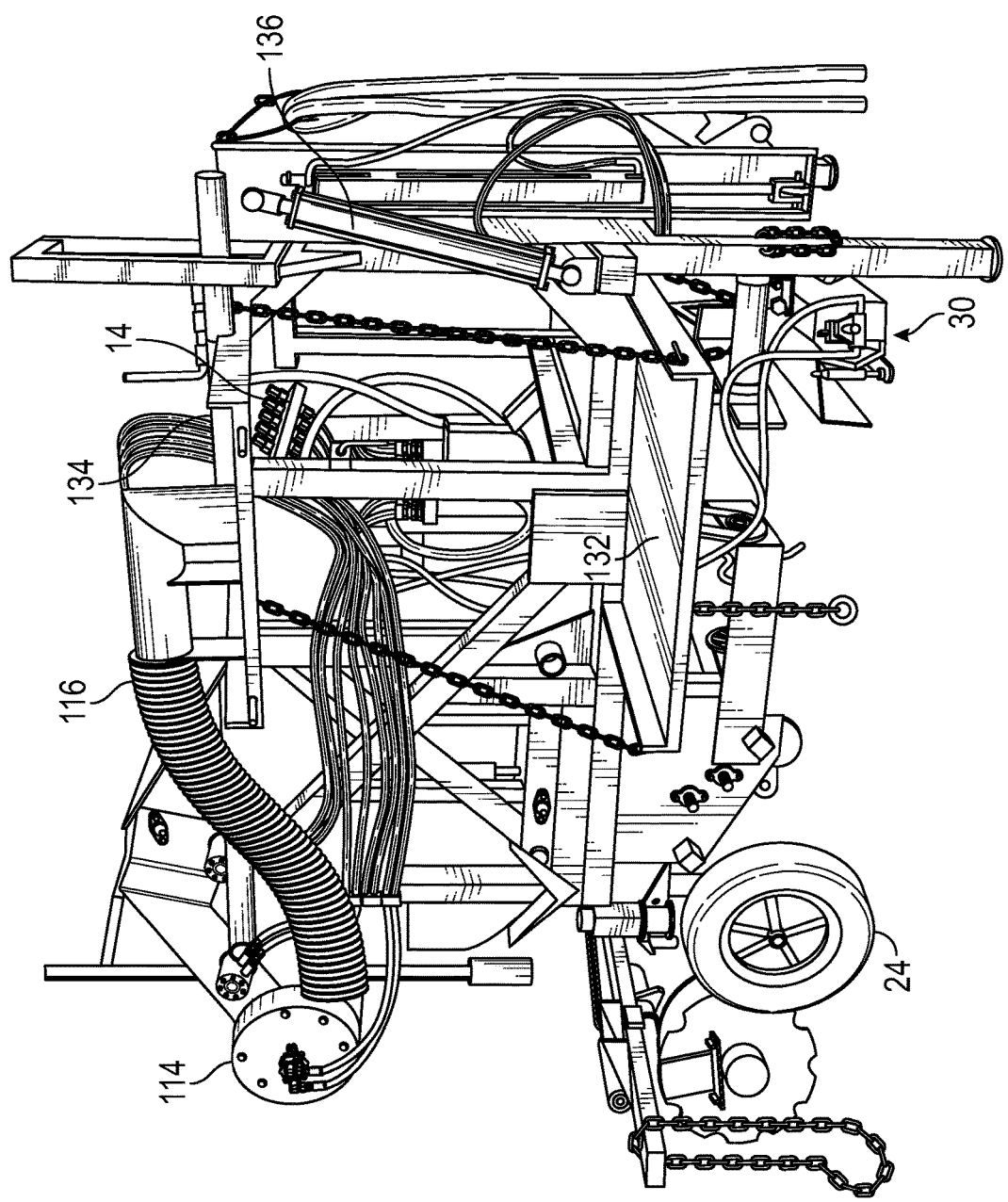
FIG. 7 shows a ride side view of an embodiment of the invention having an alternative wheel placement and skirt lifting apparatus.
Figure 8:
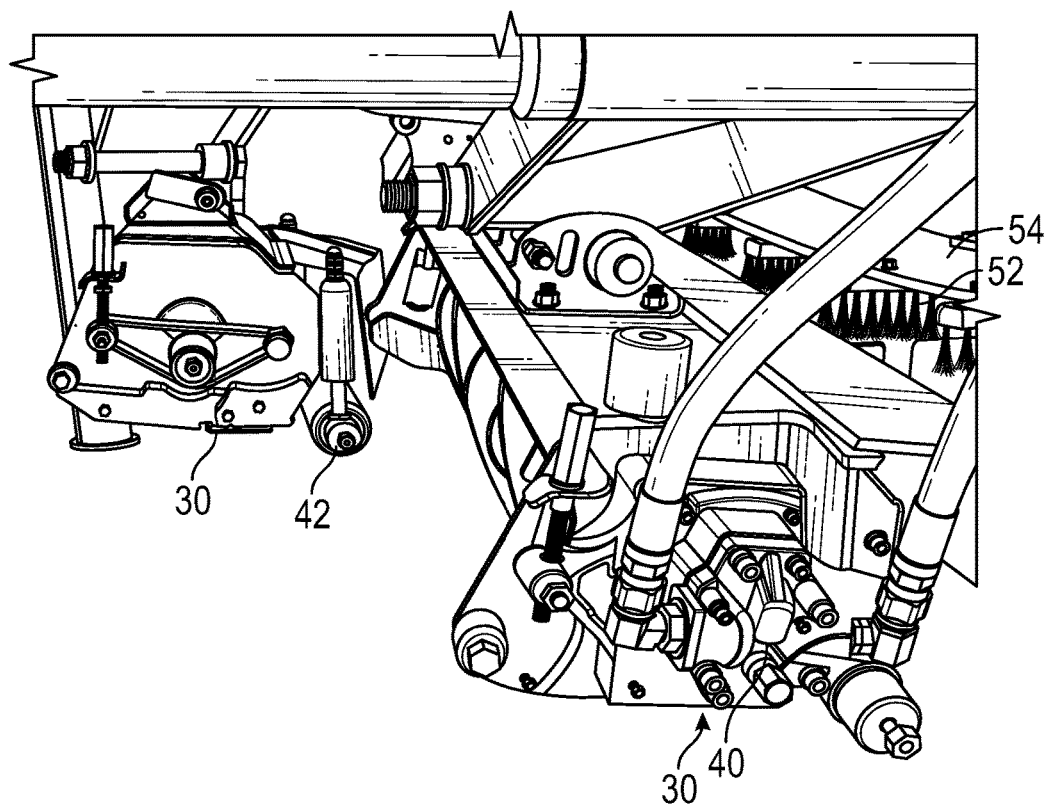
FIG. 8 shows a close-up view of mowing heads from an embodiment of the invention.

Shredded plastic mulch 202 may be blown from plastic mulch receiving bin 112 by blower 114 into flexible conduit 116 and flow into flexible receptacle 118 shown in FIG. 2. A compaction apparatus 130 may be utilized to compact flexible receptacle 118 as it fills with shredded plastic mulch 202. Compaction apparatus may comprise a stationary plate 132 and a compression plate 134, where the compression plate is urged toward the stationary plate 132 by operation of a hydraulic ram 136. The flexible receptacle 118 may hold up to 100 cubic feet of shredded plastic mulch 202, which may weigh approximately 2000 lbs. when compacted.

The agricultural implement 10 may be equipped with other features to facilitate operation and increase efficiency in field operations. For example, the agricultural implement 10 may have a disc 140 which may be utilized to turn over the soil and cut up any left-over plant material after the plastic mulch 202 has been removed. The agricultural implement 10 may also have adjustable length legs 142 to support the apparatus when not connected to a tractor 500.

Having thus described the preferred embodiment of the invention, what is claimed as new and desired to be protected by Letters Patent includes the following:

1. A mobile plastic mulch processing apparatus for recovering a plastic mulch utilized in growing a crop, wherein a portion of the crop penetrates and grows above the plastic mulch, the apparatus comprising:
   a frame having a front and a rear;
   a control center attached to the frame;
   ground engaging wheels attached to the frame;
   a mower head depending from the frame, the mower head deployable to cut the portion of crop above the plastic mulch, wherein the mower head comprises a plurality of helix shaped blades attached to a rotatable shaft;
   a plastic mulch lifting apparatus attached within the frame rearward of the reel mower head, the plastic mulch lifting apparatus comprising a lifting head disposed at a level to engage the plastic mulch after the portion of crop above the plastic mulch has been cut by the mower head, the plastic mulch lifting apparatus further comprising a pair of opposite facing rotatable continuous belts wherein, upon rotation of the opposite facing rotatable continuous belts, the plastic mulch is pinched between the opposite facing continuous belts and lifted upwardly to a plastic mulch receiving bin; and
   a first power mechanism for rotating the opposite facing continuous belts;
   a second power mechanism for rotating the rotatable shaft; and
   a plastic mulch cleaning apparatus disposed between the mower head and the plastic mulch lifting apparatus, the plastic mulch cleaning apparatus comprising a plurality of brush members disposed on a transversely mounted continuous belt wherein the transversely mounted continuous belt is rotated by a third power mechanism.

2. The mobile plastic mulch processing apparatus of claim 1 wherein the first power mechanism and the second power mechanism are actuated from the control center.

3. The mobile plastic mulch processing apparatus of claim 1 wherein the plastic mulch receiving bin comprises a plastic shredding mechanism.

4. The mobile plastic mulch processing apparatus of claim 3 wherein the plastic shredding mechanism comprises a plurality of rotating teeth mounted on a rotatable shaft, the plastic shredding mechanism further comprising a plurality of stationary teeth, said stationary teeth being intermeshed with the plurality of rotating teeth, said stationary teeth being stationary with respect to said rotating teeth upon rotation of the rotable shaft, wherein the rotatable shaft is powered by a fourth power mechanism.

5. The mobile plastic mulch processing apparatus of claim 4 further comprising a blower for blowing shredded plastic mulch from the plastic mulch receiving bin into a first end of a conduit member.

6. The mobile plastic mulch processing apparatus of claim 5 wherein the conduit member comprises a second end, wherein the second end is connected to a receptacle for receipt of the shredded plastic mulch.

7. The mobile plastic mulch processing apparatus of claim 6 wherein the receptacle comprises a flexible construction.

8. The mobile plastic mulch processing apparatus of claim 7 further comprising a compaction apparatus, wherein the receptacle is disposed within the compaction apparatus, the compaction apparatus comprising a stationary plate and a compression member, the compression member compressing the receptacle against the plate upon actuation of a fifth power mechanism.

9. The mobile plastic mulch processing apparatus of claim 1 further comprising a skirt lifting apparatus attached to a side of the frame, the skirt lifting apparatus comprising a blade member for loosening soil covering a side of the plastic mulch.

10. The mobile plastic mulch processing apparatus of claim 9 wherein the skirt lifting apparatus comprises a pivot arm upon which the blade member pivots from a first outward position to a second inward position.

11. The mobile plastic mulch processing apparatus of claim 9 wherein the skirt lifting apparatus comprises a skirt lifting belt disposed rearward of the blade member.

12. The mobile plastic mulch processing apparatus of claim 1 wherein the ground engaging wheels are attached to a wheel yoke pivotally attached at the rear of the frame and a hydraulic ram extends between the frame and the wheel yoke.

13. A mobile plastic mulch processing apparatus for recovering a plastic mulch utilized in growing a crop, wherein a portion of the crop penetrates and grows above the plastic mulch, the apparatus comprising:
   a frame having a front and a rear;
   a control center attached to the frame;
   ground engaging wheels attached to a yoke pivotally attached to the rear of the frame, wherein a hydraulic ram extends between the frame and the wheel yoke;
   a reel mower head depending from the frame, the reel mower head deployable to cut the portion of crop above the plastic mulch, the reel mower head comprising a plurality of helix shaped blades attached to a rotable shaft and a first power mechanism for rotating the rotatable shaft;
   a plastic mulch lifting apparatus attached within the frame rearward of the reel mower head, the plastic mulch lifting apparatus comprising a pair of opposite facing rotatable continuous belts wherein, upon rotation of the opposite facing rotatable continuous belts, the plastic mulch is pinched between the opposite facing continuous belts and lifted upwardly to a plastic mulch material receiving bin;
   a second power mechanism for rotating the opposite facing continuous belts; and a plastic mulch cleaning apparatus disposed between the mower head and the plastic mulch lifting apparatus, the plastic mulch cleaning apparatus comprising a plurality of brush members disposed on a transversely mounted continuous belt wherein the transversely mounted continuous belt is rotated by a third power mechanism.

14. A mobile plastic mulch processing apparatus for recovering a plastic mulch utilized in growing a crop, wherein a portion of the crop penetrates and grows above the plastic mulch, the apparatus comprising:
   a frame having a front and a rear;
   a control center attached to the frame;
   ground engaging wheels attached to the frame;

a mower head depending from the frame, the mower head deployable to cut the portion of crop above the plastic mulch;

a plastic mulch lifting apparatus attached within the frame rearward of the reel mower head, the plastic mulch lifting apparatus comprising a lifting head disposed at a level to engage the plastic mulch after the portion of crop above the plastic mulch has been cut by the mower head, the plastic mulch lifting apparatus further comprising a pair of opposite facing rotatable continuous belts wherein, upon rotation of the opposite facing rotatable continuous belts, the plastic mulch is pinched between the opposite facing continuous belts and lifted upwardly to a plastic mulch receiving bin;

a first power mechanism for rotating the opposite facing continuous belts; and a skirt lifting apparatus attached to a side of the frame, the skirt lifting apparatus comprising a blade member for loosening soil covering a side of the plastic mulch, wherein the skirt lifting apparatus comprises a skirt lifting belt disposed rearward of the blade member.

\* \* \* \* \*